United States Patent [19]

Greenewald, Jr.

[11] 4,080,508
[45] Mar. 21, 1978

[54] MANUFACTURE OF CARBIDES AND THE LIKE

[76] Inventor: Herbert Greenewald, Jr., 4296 Braunton Rd., Columbus, Ohio 43220

[21] Appl. No.: 667,691

[22] Filed: Mar. 17, 1976

[51] Int. Cl.² ............................................. H05B 7/22
[52] U.S. Cl. .......................................... 13/7; 13/31; 13/9 R
[58] Field of Search .................... 13/2, 7, 9, 31, 11, 13/34; 423/345

[56] References Cited

U.S. PATENT DOCUMENTS

| | | | |
|---|---|---|---|
| 1,134,817 | 4/1915 | Brown | 13/9 |
| 3,106,594 | 10/1963 | Beasley et al. | 13/34 X |

Primary Examiner—R. N. Envall, Jr.

[57] ABSTRACT

A metal processing furnace of the indirect arc type having opposed electrodes projected into and establishing an ionized atmosphere in the furnace crucible is provided with apparatus that introduces a finely divided charge mixture consisting essentially of silica and coke into the system for free-fall into and through the ionized atmosphere. Following reaction of the mixture's ingredients in the ionized atmosphere, silicon carbide crystals are deposited at the bottom of the furnace interior below the ionized atmosphere for subsequent collection and removal from within the furnace system. By control of charge composition and process parameters, silicon carbide crystals having predominantly either alpha or beta crystalline structures and with crystal sizes predominantly in the range of 250 to 3,000 microns are produced.

3 Claims, 7 Drawing Figures

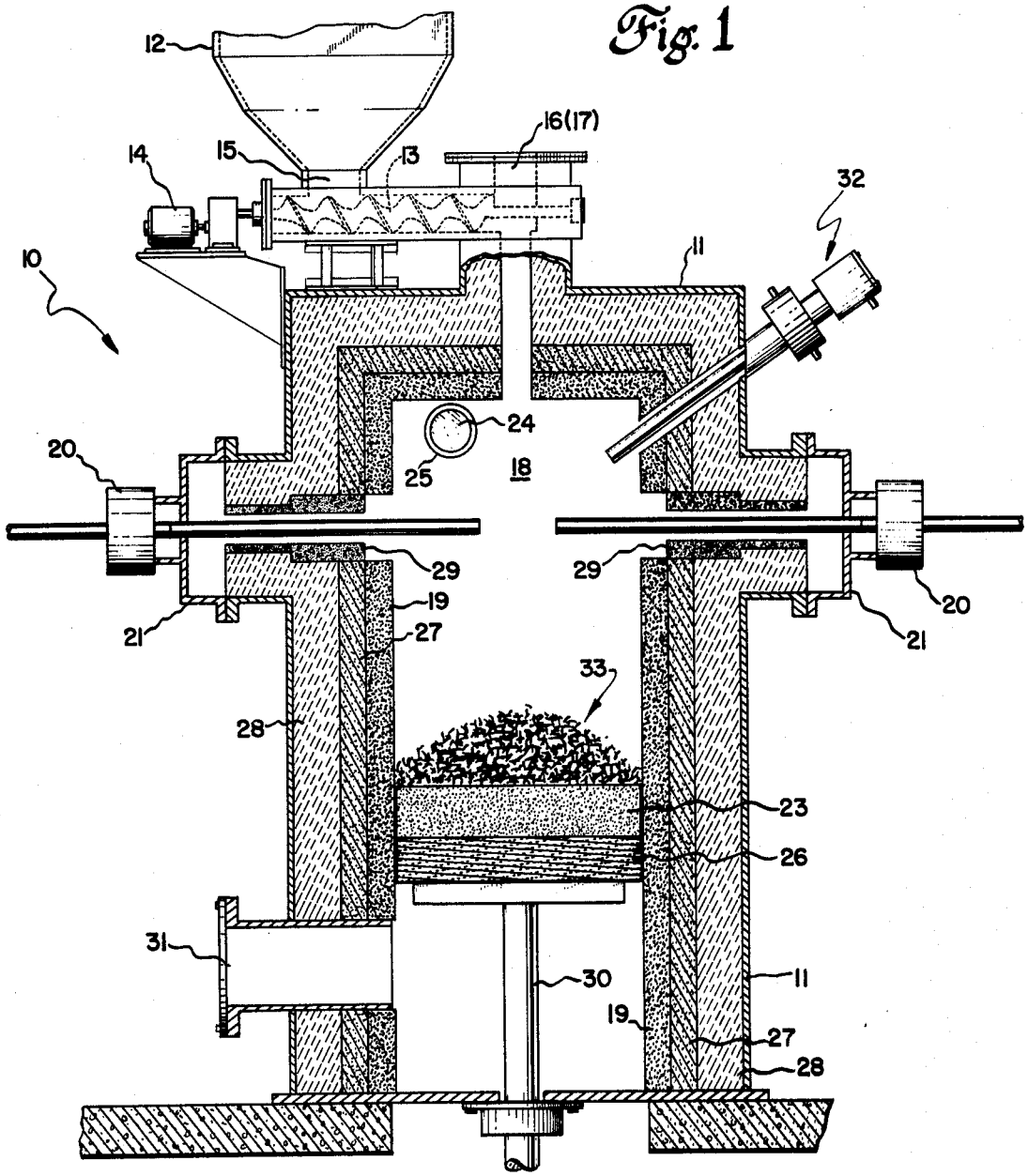
Fig. 1
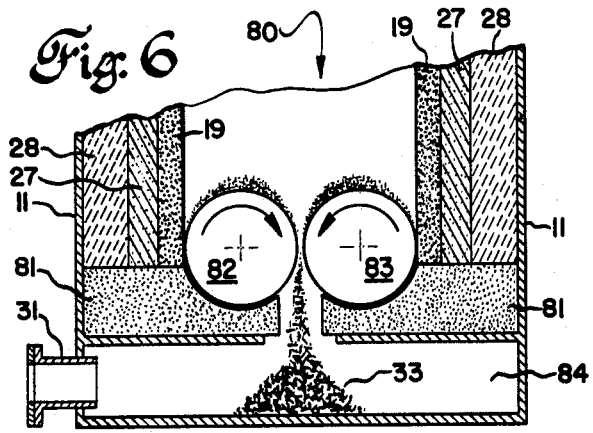
Fig. 6
Fig. 7

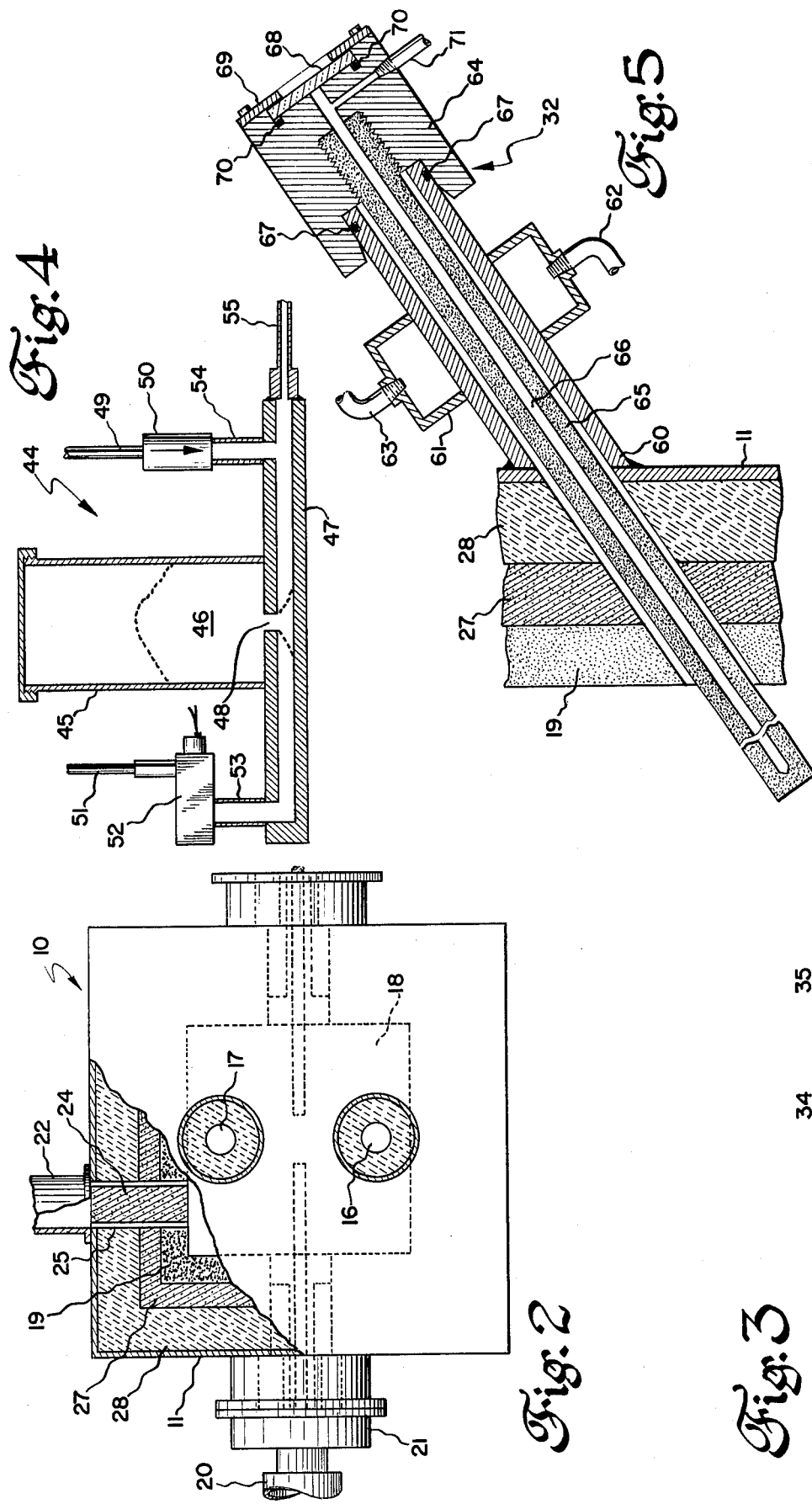

MANUFACTURE OF CARBIDES AND THE LIKE

SUMMARY OF THE INVENTION

An indirect arc furnace of the type having a closed and pressure-sealed outer shell is provided with an interiorly located graphite crucible that receives furnace charge material consisting of finely-divided silica and a carbon-containing reductant such as calcined petroleum coke to produce silicon carbide. An ionized atmosphere of proper temperature, sometimes consisting initially of elemental argon, nitrogen, or the like and usually further comprised of vapors resulting from the heating of the charge material to the furnace operating temperature, is developed by energization of a pair of opposed electrodes projected through appropriate furnace shell and lining openings into the crucible interior. The charge material is introduced into the furnace from above the electrodes for free-fall by gravity into the ionized atmosphere. Silicon carbide results from the mixture reactions accomplished in the ionized atmosphere and is subsequently deposited in crystal form at a deposit surface below the ionized atmosphere for collection and subsequent removal from the system. By control of furnace system power input, charge material composition and charge rates, and other process parameters, the produced silicon carbide product can be controlled as to predominant crystalline form (alpha or beta) and as to range of predominant crystal size, particularly above 250 microns. Under preferred operating conditions, the furnace system also is operated with a power factor of very nearly one as viewed from the electrode terminals thereby achieving improved electrical energy conversion efficiencies. Novel apparatus construction features are provided in the furnace system for injecting ionizing agents, for detecting furnace ionized atmosphere operating temperatures, for obtaining prolonged electrode operating lives, and for effecting nucleation and deposit of silicon carbide crystals.

DESCRIPTION OF THE DRAWINGS

FIG. 1 is an elevational view of an indirect arc furnace constructed and operated in accordance with this invention;

FIG. 2 is a partially sectioned plan view of the furnace of FIG. 1;

FIG. 3 is a sectional view illustrating construction details of a portion of a furnace electrode assembly;

FIG. 4 is a schematic and partially sectioned elevational view of apparatus useful for injecting powder-like ionizing agents into the furnace through the electrode assembly illustrated in FIG. 3;

FIG. 5 is a sectional view of the temperature probe assembly incorporated into the illustrated furnace system; and FIGS. 6 and 7 are elevational and plan sectional views, respectively, of an alternate construction for the bottom of the furnace crucible interior.

DETAILED DESCRIPTION

One embodiment of an indirect arc furnace involving the practice of this invention is referenced generally as 10 in the drawings. Furnace 10 has an essentially closed and pressure-sealed exterior metal shell 11 that also serves as a support for charge hopper 12 and for a pair of charge feed screws 13, of which only one is illustrated in the drawings. Each such feed screw is controllably driven by an electric motor 14 through a coupled intermediate reduction gear box. Charge hopper 12 normally is made of metal, has bottom openings such as 15 that deliver charge material to feed screw assemblies 13, and should be provided with a charging door (not illustrated) that is pressure sealed in its closed condition since furnace 10 operates without the presence of atmospheric gases within its interior crucible and frequently is advantageously operated with interior pressures either appreciably greater or appreciably less than atmospheric pressure.

Feed screw assemblies 13 deliver a silica and reductant charge material mixture received from hopper 12 into vertically-oriented charge chutes 16 and 17 (FIG. 2). It is important that such charge chutes be located in shell 11 so that the charge material introduced into crucible interior 18 defined by graphite lining 19 does not fall either onto portions the furnace electrode assemblies 20 projected within interior 18 or into the indirect arc zones established within interior 18 between and during electrical energization of the furnace electrodes.

Furnace system 10 also is provided with a pair of opposed electrode/electrode holder assemblies 20 that are each removably mounted through their respective bearing supports 21 on shell 11. Supports 21 are water-cooled and also are normally secured to shell 11 by conventional threaded fastener devices. Additional details regarding preferred electrode elements incorporated into assemblies 20 are provided below in connection with the description of FIG. 3. An effluent gas outlet 22 (FIG. 2) and a movable graphite crucible bottom 23 are also provided in furnace 10.

As shown in FIGS. 1 and 2, furnace 10 is also provided with a rigid porous nucleation filter passageway 24, bounded in part by an open-ended barrier tube 25, which cooperates with gas outlet 22. Filter passageway 24 is comprised of non-graphitic carbon having a rigid shape and having a maximum bulk density of approximately 40 to 45 pounds per cubic foot. In one satisfactory composition for passageway 24, the non-graphitic carbon had an acceptable impurity content of approximately 1.5% (by weight) ash. It is not presently known whether rigidized pure carbon at the specified bulk density is a satisfactory material for passageway 24.

Barrier tube 25 is impermeable to metal vapors and to metal oxide vapors and preferably is a dense graphite tube. The cross-sectional size and number of nucleation devices comprised of barrier 25/porous carbon filter passageway 24 and provided in furnace 10 may be varied depending on the volumetric rate at which furnace effluent gases are being produced. Only one such device is shown in the drawings. Also, extended nucleating surfaces may be developed for filter passageway element 24 by providing other than a flat configuration in the element face most adjacent to crucible interior 18.

The insulation linings incorporated into furnace 10 include a rigid non-graphitic porous carbon high temperature layer 27 installed in surrounding relation to graphite lining 19 and a foam-like refractory relatively low temperature insulation lining 28 installed in surrounding relation to porous carbon layer 27. Layer 27 preferably has the compositional and bulk density characteristics specified above in connection with the description of effluent gas nucleation passageway 24. Insulation layer 28 should be free of all occluded water and contain no water of crystallization. One satisfactory composition that has been utilized for layer 28 is comprised of alumina particles joined into a foam-like rigid shape by aluminum hydroxide bonds. A similar layer 26 of foam-like refractory functions to support crucible bottom 23 on the support table portion of reciprocable conventional hydraulic cylinder rod assembly 30 that is provided in furnace 10 for use in effecting removal of produced silicon carbide crystals 33 through discharge opening 31.

It is important that the face of lining 28 adjacent refractory lining 27 be located at a position on the thermal gradient extending from shell 11 to crucible interior 18 that does not exceed its reduction temperature with carbon. In the case of an alumina refractory lining 28, that temperature is approximately 2800° F. In the case of other types of relatively low temperature insulation such as zircon or silica free of all water, the thermal gradient temperature position is a substantially lower temperature and thus would require an appreciably greater thickness for layer 27 for most metal melting/smelting furnace operating temperature conditions. If lining 28 is formed of a foamed water-free alumina a comparatively thinner porous carbon layer 27 may be utilized in the construction of furnace 10.

In the FIG. 1 furnace embodiment, assemblies 20 are projected into the crucible interior 18 through shell 11 and vapor barrier tubes 29. Tubes 29 are preferably formed of dense graphite as in the case of vapor barrier tube 25 since they also are believed to in part function as barriers to a flow of effluent gases in bypass relation to nucleation passageway 24.

Each electrode assembly 20 slidably cooperates with a water-cooled tubular steel electrode holder 34, a welded copper tip 35, and electrically attached hollow electrode body sections 36 and 37 that normally are formed of either graphite or tungsten. Electrode section 36 is removably attached to electrode holder tip 35 by means of a threaded hollow molybdenum stud 38 and electrode section 37 is removably secured to section 36 by means of threaded hollow graphite stud 39. Electrode section 37 is of reduced cross-sectional diameter relative to section 36 to assure a preferred electrode current density of at least 600 amperes per square inch during furnace energization and operation. Tubes 40 and 41 are provided in each electrode holder 34 to define a cooling water passageway 42 and an ionizing agent passageway 43 respectively. A hose (not shown is normally attached to the outboard end of holder 34 and functions to inject either a gaseous or a granular solid ionizable atmosphere agent from apparatus 44 (FIG. 4) into the passageway 43 that passes longitudinally through electrode holder 34, hollow electrode sections 36 and 37, and hollow studs 38 and 39 for introduction into furnace interior 18.

The assembly 44 illustrated schematically in FIG. 4 may be combined into system 10 to provide a capability for introducing either or both solid and gaseous ionizing agents into the furnace crucible interior during system energization. Such assembly includes closed container 45 holding a supply of finely divided ionizing agent 46 such as potassium chloride or calcium fluoride, a delivery manifold 47 that receives solid ionizing agent from container 45 through passageway 48, and a gaseous ionizing agent (such as argon, nitrogen, etc.) supply line 49. Manifold 47 receives the gaseous agent, usually at a relatively low pressure and flow rate from supply line 49 through check valve 50 and connecting tube 54. An additional gaseous ionizing agent supply line 51 that is connected to delivery manifold 47 through a normally closed, electrically opened solenoid valve 52 and connecting tube 53. Supply line 51 has a somewhat greater gas pressure than does supply line 49. By the intermittent operation of valve 52, incremental quantities of solid ionizing agent 46 falling into manifold 47 through opening 48 may be injected into the crucible interior 18 of system 10 through the pressure hose 55 which cooperates with manifold 47 and the passageways 43 passing through electrode holder/electrode assemblies 20. Alternately, gaseous ionizing agent from supply line 49 is injected or flowed into system 10 in the same manner whenever the gas pressure in line 49 is greater than that in crucible interior 18.

Details of the temperature probe assembly 32 illustrated generally in FIG. 1 are shown schmemtically in FIG. 5.

Assembly holder 60 is tubular steel in nature and preferably is welded to shell 11 in alignment with an opening that extends through lining 19, 27, and 28. A hollow jacket 61 is welded to the exterior surface of holder 60 and receives cooling water from supply line 62. Heated water is forced from jacket 61 through discharge line 63. Assembly 32 has a probe head 64 that is slidably supported on holder 60 in sealed relation by O-ring 67 and that threadably receives and supports probe element 65. The probe element of assembly 32 is a graphite tube 65, with a blind hole 66, that projects into the ionized atmosphere within crucible interior 18.

A clear viewing window 68 is secured to head 64 by retainer ring 69 and in sealed relation to the probe interior by O-ring 70. A supply line 71 delivers nitrogen or other oxygen-free gases to the interior of head 64 and to blind passageway 66 at accurate optical pyrometer measurements of the heated tip of tube 65 projected into the ionized atmosphere contained within crucible lining 19.

In FIGS. 6 and 7 I illustrate an alternate furnace system 80 that differs in construction from system 10 primarily with respect to the bottom of crucible interior 18. Instead of utilizing a reciprocable bottom closure 23, system 80 utilizes fixed, spaced-apart graphite slabs 81 that are machined to receive and support spaced-apart graphite rolls 82 and 83. The crucible interior 18 of the furnace communicates with collection chamber 84 through the narrow gap between graphite rolls 82, 83 and through the gap between graphite slabs 81. Reduction gearing assemblies 85 and drive motors 86 are arranged to preferably rotate rolls 82, 83 slowly and continuously in opposite rotational directions. Discharge opening 31 communicates with the interior of collection chamber 84. Silicon carbide crystals deposited at the upper surfaces of graphite rolls 82,83 are fed into chamber 84 for removal from furnace system 80 by the rotation of the rolls.

A furnace of the indirect arc type having construction features illustrated in the drawings has been utilized to produce silicon carbide compounds by a reduction process in a pollution-free manner. The use of furnace system 10 for the production of silicon carbide was accomplished without emitting metal/metal oxide vapors or particles from the furnace shell, without the formation or utilization of slag, and with the production of carbon monoxide suitable for recovery from the furnace effluent gas for its contained energy values.

Specifically, a charge mixture consisting of 68.5% silicon flour, 27.4% calcined petroleum coke, 3.4% powdered limestone (calcium carbonate and magnesium carbonate), and 0.7% potassium chloride was fed into a furnace charge chute for gravity fall into an ionized atmosphere provided in a crucible interior at temperatures that were varied over the range from 3100° to 3300° F approximately. Silicon carbide crystals deposited at the crucible bottom following reduction of the silica and its combination with carbon varied in size range from 6-12 mesh (9.8% to −62 mesh (49.0%) at the deposit bottom (3100° F processing). A sample from near the top of the deposit (3300° F processing) included from 1.9% of the coarser mesh to 66% of 62 mesh or finer. The silicon carbide produced at the lower extreme of the temperature range morphologically was predominately of beta crystal structure; the silicon carbide processed at the higher temperature was alpha silicon carbide with a trace of beta.

A similar charge mixture consisting of 34.6% silica sand, 34.6% silica flour, 27.6% calcined petroleum coke, and 3.2% powdered limestone was fed into the furnace charge chute throughout an operating temperature range of 3390° initially to 3460° F at the end of the run. The silicon carbide crystals deposited at the furnace crucible bottom were a mixture of alpha and beta crystals and the crystal sizes ranged from greater than 6 mesh (44.6%) to less than 62 mesh (15.7%). A mesh size of 6 corresponds to 3360 microns while a mesh size of 62 corresponds to 250 microns. No evidence of any unreacted silica or of any silica reaction product other than silicon carbide was found in the furnace after either run.

In still another run using a furnace system incorporating the features of my invention, a charge mixture consisting of 62.5% (by weight) of acid-washed silica sand, 36.25% (by weight) of pulverized bituminous coal, and 1.25% (by weight) of wood ash was introduced into an ionized atmosphere having an operating temperature of 3500° F. The silicon carbide collected at the furnace bottom was entirely beta with no alpha crystals present. The collected beta silicon carbide crystals were loosely formed agglomerates with an average agglomerate particle size of 0.49 microns. Apparently the individual crystallites in the particles are in the range of 0.2 microns or smaller.

The nature and shape of the stack of silicon carbide produced in these runs and the microscopic examination of the product indicates that the reaction is completed by the time the silicon carbide crystals pile up on the stack. The presence of a uniform layer of silicon carbide crystals on the electrodes throughout their hot zone, including the area protected from a direct line of sight to the charging path by the sides of the electrode holes, indicates that the atmosphere within the furnace is charged with vapors which will deposit silicon carbide crystals on a suitable substrate. It appears that the silica and carbon being charged to the furnace are essentially vaporized as some species of ionized material during the free fall of the charge material through the high ionized, hot furnace atmosphere. It is well known that the vapor pressure of silicon metal at these temperatures is substanially higher than the equilibrium vapor pressure of silicon metal over silicon carbide. It is therefore presumed that either the silicon carbide crystals form in mid passage from these vapors and fall as a rain of silicon carbide crystals or that the vapors being more concentrated in the specific area of the furnace directly below the charge hole condense as silicon carbide crystals on top of the forming stack in the furnace.

So far silicon carbide, chromium carbide, and aluminum carbide have been made in this furnace by the above process. Of these, only silicon carbide has current commercial use. It is expected that other carbides could be made in this furnace with the present process using different ores and furnace temperatures. Examples of such commercial carbides would be carbides of the following elements: boron, molybdenum, tungsten, titanium, calcium, zirconium. It is also believed probable that if nitrogen were to be injected into the furnace in adequate volumes, nitrides of these metals might be produced instead of carbides. Some of these nitrides have potential commercial uses.

I claim:

1. In an indirect arc furnace system for producing carbide crystals and the like from a finely-divided furnace charge material, in combination:
    (a) a pressure-sealed furnace shell having an interior free-fall zone surrounded by insulation;
    (b) opposed electrodes projected through said pressure-sealed shell and establishing an ionized atmosphere within said interior free-fall zone;
    (c) charging means introducing said finely-divided furnace charge material into said free-fall zone through said shell from above said ionized atmosphere in non-striking relation with respect to said electrodes;
    (d) movable collection means located beneath said electrodes and developing a deposit surface that receives crystals from the reaction of said finely-divided furnace charge material in said ionized atmosphere;
    (e) discharge opening means for use in removing collected crystals from within said pressure-sealed shell; and
    (f) powered means connected to said collection means in movement causing relation,
    said powered means being operated to move said collection means and thereby cause the crystal deposit surface developed by said collection means to be maintained at a select, substantially constant crystallization temperature and to enable said finely-divided furnace charge material to freely fall by gravitational forces through said free-fall zone without restriction to said crystal deposit surface.

2. The furnace system defined by claim 1 wherein said collection means includes a reciprocable graphite crucible surface supporting an accumulation of crystals, said graphite crucible surface being movable transversely with respect to the longitudinal axes of said electrodes to maintain the deposit surface formed by said accumulation of crystals at said crystallization temperature.

3. The furnace system defined by claim 1 wherein said collection means includes a pair of spaced-apart, cylindrical graphite surfaces supporting an accumulation of crystals, said cylindrical graphite surfaces being counter-rotated with respect to each other to maintain the deposit surface formed by said accumulation of crystals at said select crystallization temperature by moving portions of said accumulation of crystals through the space between said cylindrical graphite surfaces for subsequent removal through said discharge opening means.

* * * * *